No. 709,903. Patented Sept. 30, 1902.
S. HARPER.
ASPHALT HOE.
(Application filed Dec. 7, 1901.)
(No Model.)

Witnesses
T. R. Jefferson
John M. Hess

Inventor
Smith Harper
By R. C. Wright
Atty.

THE NORRIS PETERS CO., PHOTO-LITHO., WASHINGTON, D. C.

UNITED STATES PATENT OFFICE.

SMITH HARPER, OF ABINGTON TOWNSHIP, MONTGOMERY COUNTY, PENNSYLVANIA, ASSIGNOR TO SMITH HARPER, CHARLES S. HARPER, AND FRANK W. HARPER, TRADING AS SMITH HARPER & SONS.

ASPHALT-HOE.

SPECIFICATION forming part of Letters Patent No. 709,903, dated September 30, 1902.

Application filed December 7, 1901. Serial No. 85,053. (No model.)

*To all whom it may concern:*

Be it known that I, SMITH HARPER, a citizen of the United States, residing in Abington township, in the county of Montgomery and State of Pennsylvania, have invented certain new and useful Improvements in Asphalt-Hoes, of which the following is a specification.

The object of my invention is to construct an implement for the manipulation of asphalt when in a plastic state in such work as street-paving, laying of walks, and like service. In handling a mass of the asphalt it is best for the operator to draw it toward him, while it is best to reverse the operation or push it from him when smoothing its surface.

My invention provides a single implement or tool adapted to both uses and operations.

The hoe as heretofore constructed and used is not adapted for pushing the material from the operator, owing to its angularity to the work and the force it is necessary to exert in moving the sticky mass, but with the construction here presented the operator has simply to reverse the tool to suit the operation of drawing or leveling and smoothing.

My invention is illustrated in the accompanying drawings, in which—

Figure 1:
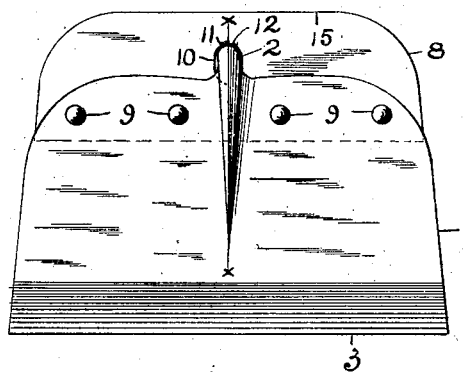
Figure 2:
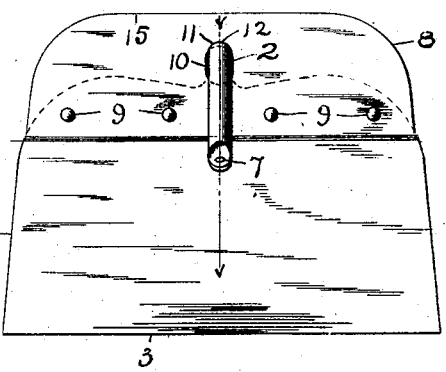
Figure 3:
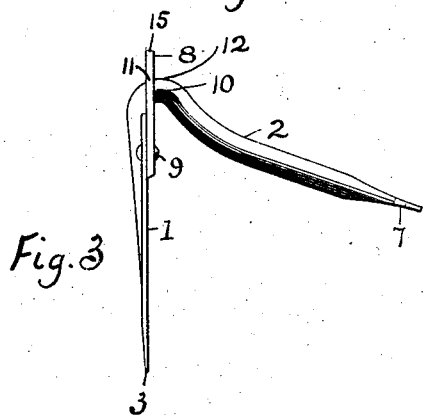
Figure 4:
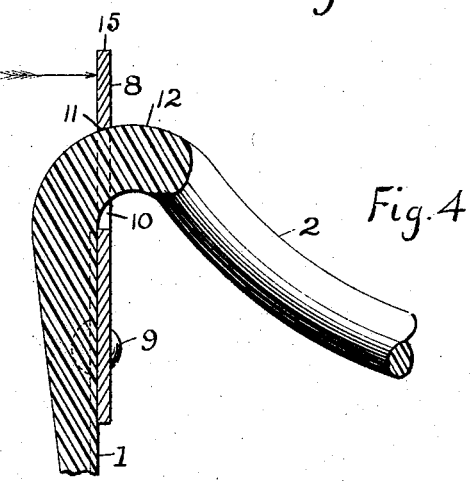
Figure 5:
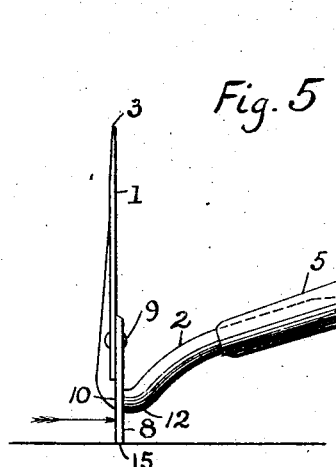
Figure 6:
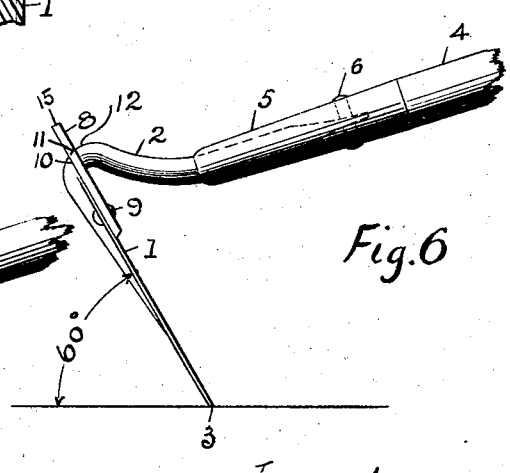

Figure 1 is a front view. Fig. 2 is a rear view. Fig. 3 is an edge view. Fig. 4 is a central vertical section, on an enlarged scale, on line *x x*, Fig. 1, and line *v v*, Fig. 2. Fig. 5 is an edge view of the implement as in use for scraping, leveling, smoothing, and pushing material from the operator. Fig. 6 is an edge view of the implement as in use for drawing material toward the operator or as an ordinary hoe.

Similar figures of reference indicate similar parts throughout the views.

Blade 1 has a shank 2 formed integral therewith, the blade being beveled back from its lower edge 3, and the shank is secured in a handle 4, having a ferrule 5, with a rivet 6 passing through hole 7 in shank 2 and also through ferrule 5 and handle 4. So far the implement is of my usual construction. Upon the upper part of hoe-blade 1 is secured a plate 8 by rivets 9, the upper edge of plate 8 extending above or beyond the upper edge of blade 1, and in order to permit such attachment a hole 10 is made in plate 8, through which shank 2 is passed, the upper edge 11 of hole 10 being beveled to close down tight and snugly fit the curved neck 12 of shank 2 and below the top of the curve, (see Fig. 4,) so that pressure in the direction of the arrow will be resisted by the upwardly-curving surface of the neck which supports plate 8. When the hoe is used as seen in Fig. 6, the leverage from edge 3 to neck 12 is too great for a scraper for manipulating asphalt in a plastic state, as the asphalt parts then closely adhere to each other and much force must be exerted to do the work; besides, the sixty-degrees angle of the blade 1 to the work is not suitable to produce an even level surface, the blade edge 3 having a tendency to spring and to dig into the material below its surface. As the operator can push more than he can pull, he has simply to reverse the hoe to the position shown in Fig. 5, when handle 4 will assume the same angle and be as convenient to handle as before, the plate 8 will be at a right angle to the working surface, so that it will not tend to dig in, the leverage being short from the working edge 15 to the point 11 on neck 12, where it is backed up and supported, the plate will not spring, and the plate 8 being firm and in proper position the work of scraping, truing, and smoothing is easily and accurately done.

I claim—

1. In an asphalt-hoe, a blade, a shank therefor, a handle for the shank, a scraper-plate in alinement with the hoe-plate and having an aperture for the insertion of the shank, and means to secure the plate to the blade aforesaid, in alinement therewith and at the blade's upper part so that the plate shall extend above the upper edge of the blade, and above its shank.

2. In an asphalt-hoe, a blade, an integral shank therefor, a ferrule and a handle secured to the shank, a plate secured to the blade in alinement therewith and projecting beyond the upper edge of the blade, an aperture in the plate through which the shank is inserted, and an upper edge to the aperture adapted to closely fit the shank and thereby support it to resist the pressure upon the front of the plate.

3. In an asphalt hoe and scraper, a blade, a shank integral with the blade, the shank upwardly tending and backwardly curved, a handle secured to the shank so that the blade shall stand at about an angle of sixty degrees from a horizontal line at its working edge; a scraper-plate secured to the blade at its upper part, and in alinement therewith, an aperture in the scraper-plate having its upper side formed to closely fit and be supported against the curve of the shank at a point below its highest part.

In testimony whereof I affix my signature in presence of two witnesses.

SMITH HARPER.

Witnesses:
R. C. WRIGHT,
WILLIAM C. STOEVER.